United States Patent [19] [11] 4,361,753
Schubert et al. [45] Nov. 30, 1982

[54] PROCESS FOR INTERCONNECTING AN ACTUATOR AND A POSTAGE METER

[75] Inventors: Keith E. Schubert, West Norwalk; David B. Albright, Stratford; Charles M. Weimer, Norwalk; Philip Pollak, Jr., Westport, all of Conn.

[73] Assignee: Pitney Bowes Inc., Stamford, Conn.

[21] Appl. No.: 167,516

[22] Filed: Jul. 11, 1980

[51] Int. Cl.$^3$ .......................... G07G 1/00; B23Q 17/00
[52] U.S. Cl. ................................ 235/101; 33/174 G; 33/181 R
[58] Field of Search ............... 235/1 D, 101; 226/134; 221/2; 74/89.15; 33/174 R, 174 H, 174 G, 174 K, 185 R–188, 180 R–181 R

[56] References Cited

U.S. PATENT DOCUMENTS 2,666,266 1/1954 Sinhel .............................. 33/180 R
2,878,576 3/1959 Crumb .............................. 33/181 R
3,126,776 3/1964 Whistler, Sr. et al. ........... 33/181 R
3,502,266 3/1970 Clemans .............................. 235/101
4,119,161 10/1978 Price et al. ...................... 235/101 X
4,121,473 10/1978 Schubert et al. .................. 74/89.15
4,280,279 7/1981 Grundfest ........................ 33/180 R

*Primary Examiner*—L. T. Hix
*Assistant Examiner*—Benjamin R. Fuller
*Attorney, Agent, or Firm*—Donald P. Walker; William D. Soltow; Albert W. Scribner

[57] ABSTRACT

A process for interconnecting a postage meter and apparatus for operating the postage meter; wherein the postage meter includes a lever which is positionable in a plurality of postage value selecting positions, and the apparatus includes a member for positioning the postage meter lever. The process comprises the steps of fixing the spatial relationship between the postage meter and meter operating apparatus, and then fixing the spatial relationship between the postage meter lever and lever positioning member.

17 Claims, 8 Drawing Figures

PROCESS FOR INTERCONNECTING AN ACTUATOR AND A POSTAGE METER

BACKGROUND OF THE INVENTION

This application is related to U.S. application Ser. No. 167,517 of D. B. Albright et al. and to U.S. application Ser. No. 167,518 of C. M. Weiner, both of which applications are entitled *Apparatus for Interconnecting an Actuator and a Postage Meter,* were filed concurrently herewith and are assigned to the assignee of the present invention.

Apparatus for operating postage meters, such as the postage meter actuators of the type shown in U.S. Pat. No. 4,121,473, issued Oct. 24, 1978 to K. E. Schubert and P. Pollak, Jr., and assigned to the assignee of the present invention, are adapted to be removably mounted in operating relationship with respect to postage meters; for example, on a postage meter such as a Model 2200 or Model 5300 postage meter commercially available from the assignee of the present invention or on a suitable support associated with such a postage meter. Such postage meters generally include postage value printing means and a plurality of postage value selecting levers. The postage meter levers are operationally coupled by well-known means to the printing means and are individually manually positionable in a plurality of positions for selecting the desired postage value to be printed. The actuators generally include means for automatically positioning the postage meter levers in response to electrical signals generated for example by means of a data processor associated with an electronic scale in a mailing system of the type discussed in U.S. Pat. No. 4,246,525, issued Jan. 20, 1981 to V. G. Coppola and assigned to the assignee of the present invention. In such mailing systems the scale includes a pan for weighing mailpieces, and the data processor generates signals which are a function of mailpiece weight, destination and transportation class. Before the actuator is mounted in the operating relationship with respect to the postage meter, the postage meter levers must be located in a reference position and aligned with the lever positioning means of the actuator, for synchronizing the actuator and postage meter with respect to each other; so as to synchronize the postage meter with the remainder of the mailing system, including the zero weight level of the scale pan, to ensure printing postage values which are a function of the weight of the mailpieces placed on the scale pan. Accordingly:

An object of the present invention is to provide a process and apparatus for interconnecting a postage meter and a postage meter operating apparatus, such as an actuator, for operation in synchronism with each other;

Another object is to provide a process and apparatus for interconnecting a postage meter having postage value selecting levers, and an actuator having means for positioning the postage meter levers; and Another object is to provide a process and apparatus for accurately mounting an actuator, having means for positioning postage meter levers, in operating relationship with respect to a postage meter having levers which are positionable in a plurality of postage value selecting positions.

SUMMARY OF THE INVENTION

A process for interconnecting a postage meter and apparatus for operating the postage meter; wherein the postage meter includes a lever which is positionable in a plurality of postage value selecting positions, and the apparatus includes means for positioning the postage meter lever. The process comprises the steps of fixing the spatial relationship between the postage meter and meter operating apparatus, and then fixing the spatial relationship between the postage meter lever and lever positioning means.

BRIEF DESCRIPTION OF THE DRAWINGS

As shown in the drawings, wherein like reference numerals designate like or corresponding parts throughout the several figures.

DESCRIPTION OF THE PREFERRED EMBODIMENT

Figure 1:
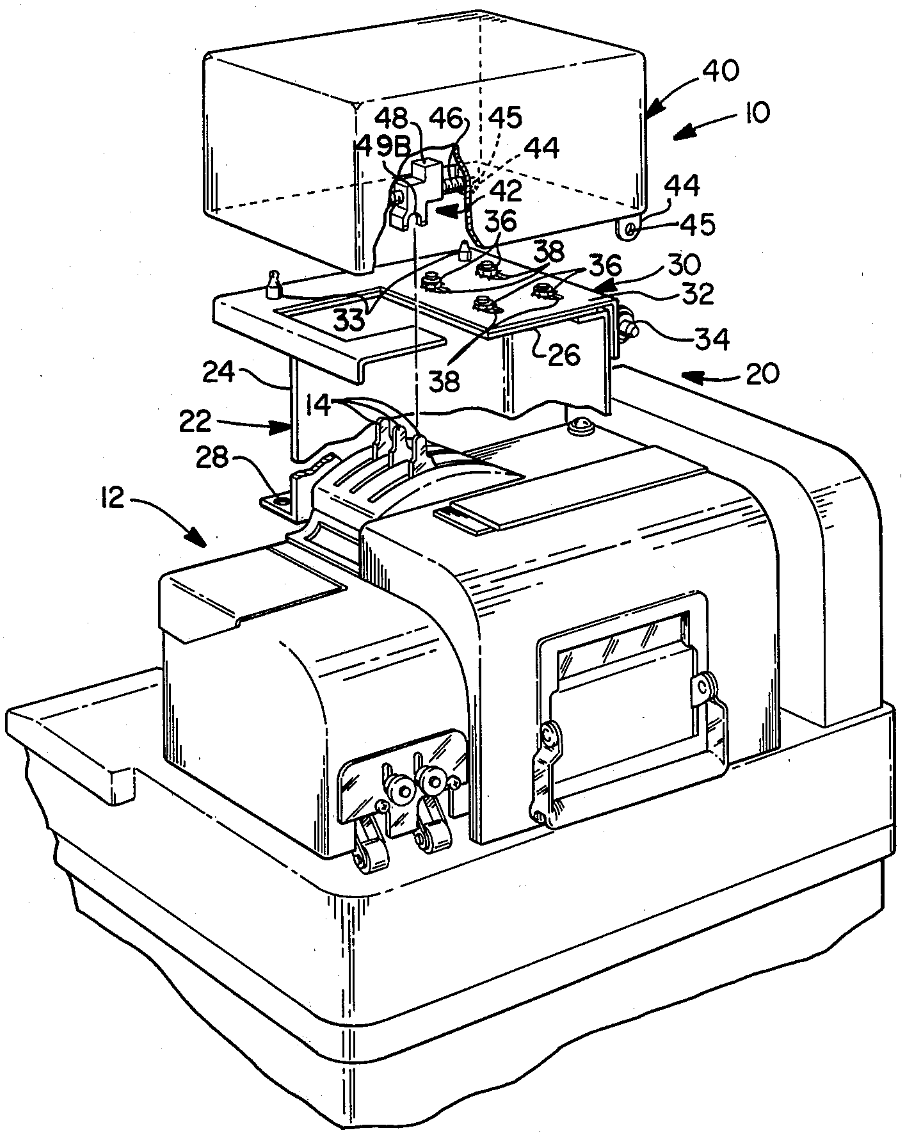
FIG. 1 is an exploded perspective view of a postage meter and apparatus for operating the postage meter.

There is shown in FIG. 1 an actuator 10 of the type which is removably interconnectable in operating relationship with respect to a postage meter 12 such as a Series 5300 or 2200 Postage Meter commercially available from the assignee of the present invention. The postage meter 12, generally includes well-known means for printing postage (not shown), and includes a plurality of postage value selecting levers 14. The levers 14 are operationally coupled by well-known means to the printing means and are manually positionable in a plurality of positions, corresponding to the values of zero through nine identified by numerals 16 (FIG. 2) on the postage meter 12, for selecting the desired postage value to be printed.

Figure 2:
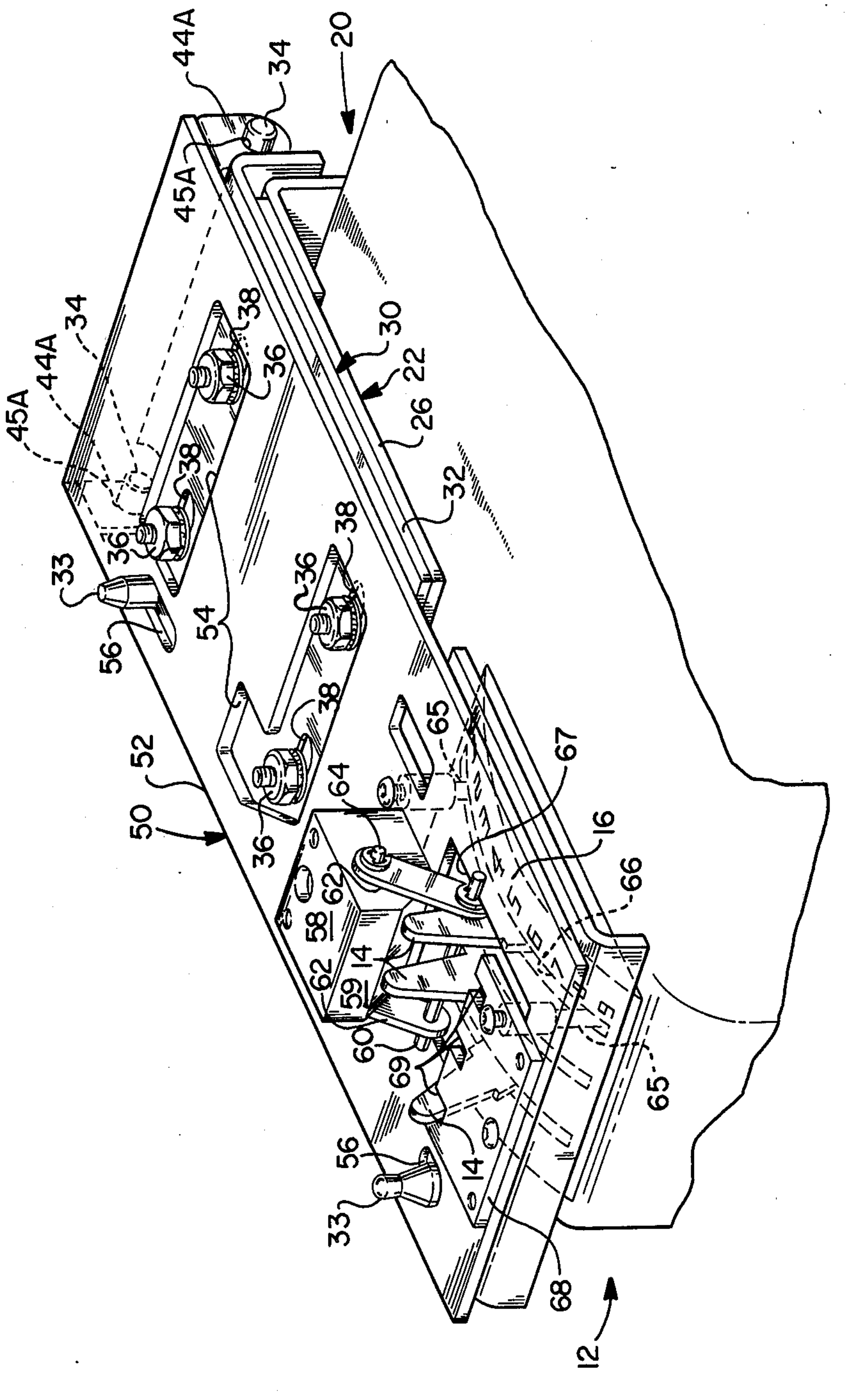
FIG. 2 is a perspective view of an embodiment of gauging means used according to the invention shown in association with a fragmentary perspective view of a postage meter.
Figure 4:
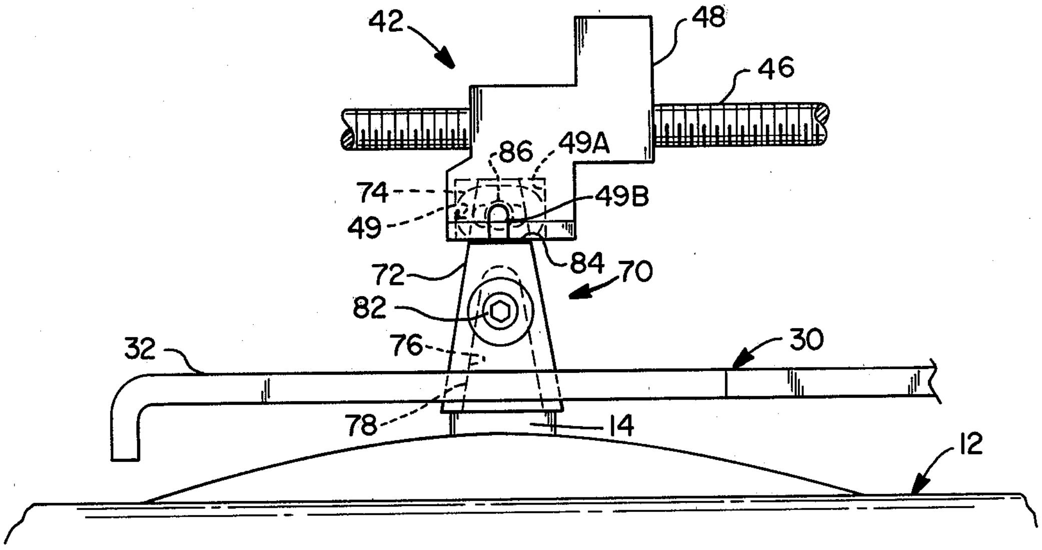
FIG. 4 is a view of FIG. 3, showing the gauging means removed from the postage meter and the lever extension means coupled to the meter operating apparatus of FIG. 1.

The actuator 10 (FIG. 1) includes framework for removably mounting the actuator 10 in operating relationship with respect to the postage meter 12. The actuator's framework includes a support 20 which acts as a pedestal for the actuator 10. The support 20 comprises a base portion 22 which includes an upright skirt wall 24, which is L-shaped in transverse cross-section, and a transversely-extending top wall 26. The skirt wall 24 is preferably adapted, as by means of a plurality of fasteners 28, for attaching the support 20 to any conveniently located structure other than the postage meter 12, so as to permit removal of the postage meter 12 independently of removal of the actuator 10, but may be similarly adapted for removable attachment directly to the postage meter 12. The support 20 also comprises a head portion 30, which includes a top wall 32, at least one guide post 33 and a pair of spaced apart hinge pins 34 (FIG. 2). The head portion 30 (FIG. 1) is conventionally adjustably fixable to the base portion 22, for example as by means of a plurality of fasteners 36 which respectively extend through a like number of oversized apertures 38, formed in the head portions' top wall 32, to conventionally threadably engage the base portions' top wall 26. The actuator's framework also includes a housing 40 which contains the various operating components of the actuator 10, including the actuator's lever positioning means 42. The housing 40 includes a pair of depending hubs 44, each of which has an aperture 45 formed therein. And the lever positioning means 42 includes, for each postage meter lever 14, a motor-driven, rotatably mounted screw 46 and a lever positioning member 48, having a cavity 49 (FIG. 4) which includes a reference wall 49A and/or reference slot 49B. The lever positioning member 48 (FIG. 1) is threadably connected to the screw 46 and constrained by well-known means for movement between two limit stops (not shown) in a path of travel which extends parallel to the axis of the screw 46; the direction of such movement being a function of the direction of rotation of the screw 46. The actuator 10 is manufactured to meet the close tolerances normally adhered to for manufacturing precision measuring devices. Accordingly, although for accurate alignment of the actuator 10 with postage meter 12, such alignment is made on the basis of a predetermined spatial relationship which exists between the axis of the hub apertures 45 and the respective locations of the wall 49A (FIG. 4) and/or slot 49B of the cavity 49 of each of the actuator's lever positioning members 48, when the members 48 (FIG. 1) are located at the midpoint between their respective limit stops; after such alignment the levers 14 and lever positioning members 48 may be independently moved to any one of ten positions corresponding to the ten positions 16 of the lever 14 and remain in synchronism with the levers 14. The hubs 44 are appropriately spaced apart from each other to permit the apertures 45 to pivotably receive the support's hinge pins 34, for pivotally mounting the housing 40 in engagement with the support 20 in a manner which affords for ease of disengagement of the housing 40.

According to the invention there is provided a process and apparatus for interconnecting an actuator 10 (FIG. 1) to a postage meter 12. The process generally includes the steps of initially fixing the spatial relationship between the postage meter 12 and the actuator 10; and then fixing the spatial relationship between the postage meter's levers 14 and the actuator's lever positioning means 42. And, one of the embodiments of the apparatus generally includes a gauge 50 (FIG. 2) which is adapted to facilitate fixing the spatial relationship between the postage meter 12 and actuator 10.

As shown in FIG. 2, the actuator's housing 40 (FIG. 1) is disengaged from the support 20 (FIG. 2), and the gauge 50 is pivotally mounted in place on the support 20. The gauge 50 includes a gauge plate 52, and includes a pair of parallel spaced depending hubs 44A having apertures 45A. The hubs 44A and apertures 45A correspond to the hubs 44 (FIG. 1) and apertures 45 of the actuator housing 40. In addition, the gauge plate 52 (FIG. 2) has a pair of apertures 54, which are dimensioned to permit the operator to access the fasteners 36. The gauge 50 also includes a pair of reference apertures 56, which are spaced apart from each other and cooperatively dimensioned for slip-fitting engagement with the support posts 33; so that, assuming the fastener's 36 are loosened, movement of gauge 50 results in movement of the support's head portion 30, including the depending hinge pins 34, relative to the postage meter 12. The gauge 50 additionally comprises a gauge block 58 having a reference surface 59. The gauge block 58 is fixedly attached to the gauge plate 52 for movement therewith. And, the same predetermined spatial relationship exists between the gauge surface 59 and the axis of the gauge's hub apertures 45A as exists between the lever positioning member's cavity wall 49A (FIG. 4) and the axis of the actuator's hub apertures 45 (FIG. 1). The gauge 50 also includes a gauge bar 60 and a pair of gauge arms 62. One of the ends of each of the gauge arms 62 is pivotally attached to the gauge block 58, by means of a shaft 64 which extends through the block 58 and parallel to the axis of the hub apertures 45A. And the other ends of each of the gauge arms 62 are suitably attached to the gauge bar 60, for carrying the gauge bar 60 parallel to the axis of the hub apertures 45A. In addition, the gauge 50 includes a pair of parallel-spaced guide posts 65, which depend from the gauge plate 52 for insertion into a predetermined one of the slots 66 within which the respective postage meter levers 14 are movable. Further, the gauge 50 includes a rectangularly-shaped aperture 67 through which the postage meter levers 14 upwardly protrude. And, inasmuch as many postage meter levers 14, through wear and tear have been bent out of alignment by users, it is a feature of the invention that the gauge 50 also includes a lever alignment measuring plate 68 having a plurality of parallel-spaced slots 69 formed therein which are located and dimensioned to properly receive the postage meter levers 14 when the levers 14 are properly straightened and aligned parallel to each other. In this connection the Installer of the actuator 10 may find it necessary to bend the levers 14 into alignment with each other and straighten the same to within the tolerances fixed by the gauge slots 69.

For fixing the spatial relationship between the postage meter 12 (FIG. 1) and the actuator 10, the fasteners 36 (FIG. 2) are initially loosened to permit movement of the support's head portion 30, and thus the connected hinge pins 34, relative to the support's base position 22. In addition, the postage meter levers 14 are positioned in their respective midpoint or "5" positions. Thereafter, the Installer pivots the gauge bar 60 away from the gauge plate apertures 67 and toward the hubs 45A; and, while holding the gauge 50 at an angle of approximately 45 degrees with respect to the horizontal, aligns the hub apertures 45A with the support's hinge pins 34 and slidably engages the respective hubs 44A and hinge pins 34. Thereafter the gauge 50 is pivotally lowered by the Installer while simultaneously shifting the same to align the gauge plate apertures 56 with the support posts 33. Whereupon the gauge apertures 56 are cooperatively slip-fitted into engagement with the support posts 33, and the gauge plate guide posts 65 are lowered into the appropriate postage meter lever slot 66. The postage meter levers 14 are then shifted toward and disposed in the gauge plate slots 69. And, if the levers 14 cannot be so disposed, they are bent, as necessary, into vertical alignment with each other and then disposed in the slots 69. Movement of the levers 14 into their respective alignment slots 69 provides clearance for pivoting the gauge bar 60 toward the gauge plate aperture 67 and into contact with the gauge plate 52. When the gauge bar 60 is so located the postage meter levers 14 are repositioned in their respective midpoint or "5" positions, and the gauge 50 is shifted toward the postage meter levers 14 until the gauge bar 60 contacts the levers 14. Whereupon the fasteners 36 are tightened to fix the position of the support 20 relative to the postage meter 12, by fixing the position of support's head portion 30 relative to the base portion 22.

Figure 3:
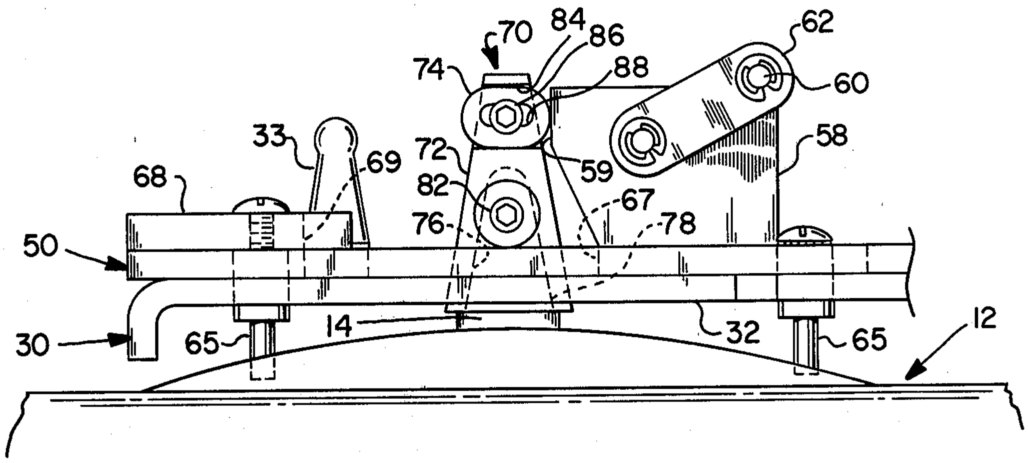
FIG. 3 is an enlarged, fragmentary side view of the gauging means of FIG. 2 shown in association with a fragmentary view of a postage meter which is modified to include postage meter lever extension means used according to the invention.

The foregoing procedure fixes the position of the actuator's hub apertures 45 (FIG. 1) relative to the postage meter levers 14, by fixing the position of the support's hinge pins 34 (FIG. 2) relative to the postage meter levers 14, while the levers 14 are respectively disposed in their midpoint or "5" positions. On the other hand, for accurately operatively interconnecting the actuator 10 and postage meter 12, the spatial relationship between the actuator's hub apertures 45 and actuator's lever positioning members 48, when the members 48 are located midway between their respective limit stops, should correspond to the spatial relationship between the support's hinge pins 34 and the postage meter levers 14, when the levers 14 are located in their respective midpoint or "5" positions. And, this may be done after the foregoing procedure by fixing the spatial relationship between the postage meter levers 14 and the actuator's lever positioning members 48 when they are respectively located in their midpoint positions. To that end, the apparatus for interconnecting the actuator 10 and postage meter 12 additionally includes a postage meter lever extension means, one of the embodiments of which is shown in FIG. 3. As shown in FIG. 3, the lever extension means includes a plurality of postage meter lever extension devices 70, one for each of the postage meter levers 14.

Each of the lever extension devices 70 (FIG. 3) includes a wedge-shaped body portion 72 and an adjustable head portion 74. The body portion 72 has a wedge-shaped cavity 76 formed therein which is dimensioned to accomodate receiving the free end 78 of the postage meter lever 14, for mounting the lever extension device 70 on the postage meter lever 14. And, for fixedly attaching the lever extension device 70 to the lever's free end 78 for movement with the lever 14, the lever extension device 70 includes conventional fastening means, such as a set screw 82 which is suitably threadably mounted in the body portion 72 so as to extend into the cavity 76 for engaging the postage meter lever 14. The body portion 72 also includes a U-shaped channel 84 formed therein which is dimensioned to slidably receive the head portion 74. And, for adjustably fixedly attaching the head portion 74 to the body portion 72 for movement therewith, the lever extension devices 70 includes conventional fastening means, such as a headed screw 86 which extends through a slot 88 formed in the head portion 74 and is suitably threadably attached to the body portion 72 within the channel 84.

For fixing spatial relationship between the postage meter levers 14 (FIG. 3) and the actuator's lever positioning means 42 (FIG. 4); subsequent to fixing the spatial relationship between both the actuator's hub apertures 45 (FIG. 1) and support's hinge pins 34 relative to the postage meter levers 14 has hereinbefore discussed, a lever extension device 70 (FIG. 3), having both screws 82 and 86 loosened, is mounted on each of the levers 14. Whereupon each of the extension devices 70 may be fixedly attached to its associated lever 14 by tightening its screw 82. Thereafter, the head portion 74 of each of the lever extension devices 70 is slidably moved toward and into contact with the gauge surface 59, and the headed screw 86 is tightened for fixedly attaching the device's head portion 74 to its associated body portion 72. Inasmuch as the same predetermined spatial relationship exists between the gauge surface 59 (FIG. 2) and gauge apertures 45A as exists between the lever positioning member's cavity wall 49A (FIG. 4) and actuator hub apertures 45 (FIG. 1), when the postage meter levers 14 and positioning members 48 are respectively disposed in their midpoint positions; the result is to properly fix the spatial relationship between the postage meter levers 14 and lever positioning members 48 (FIG. 4) to permit accurate operation of the postage meter 12 by the actuator 10. Accordingly, the gauge 50 (FIG. 3) may be removed by pivotally raising the gauge 50 (FIG. 2) and slidably disengaging the respective gauge hubs 44A and support's hinge pins 34. Whereupon the Installer may move the levers 14 and lever positioning members 48 to any desirable or predetermined position in which they are in correspondence with each other, align the actuator's hub apertures 45 with the hinge pins 34, slidably engage the respective actuator hubs 44 and hinge pins 34, and pivotally lower the actuator 10 and thus the lever positioning members 48 into engagement (FIG. 4) with the lever extension devices 70.

Figure 5:
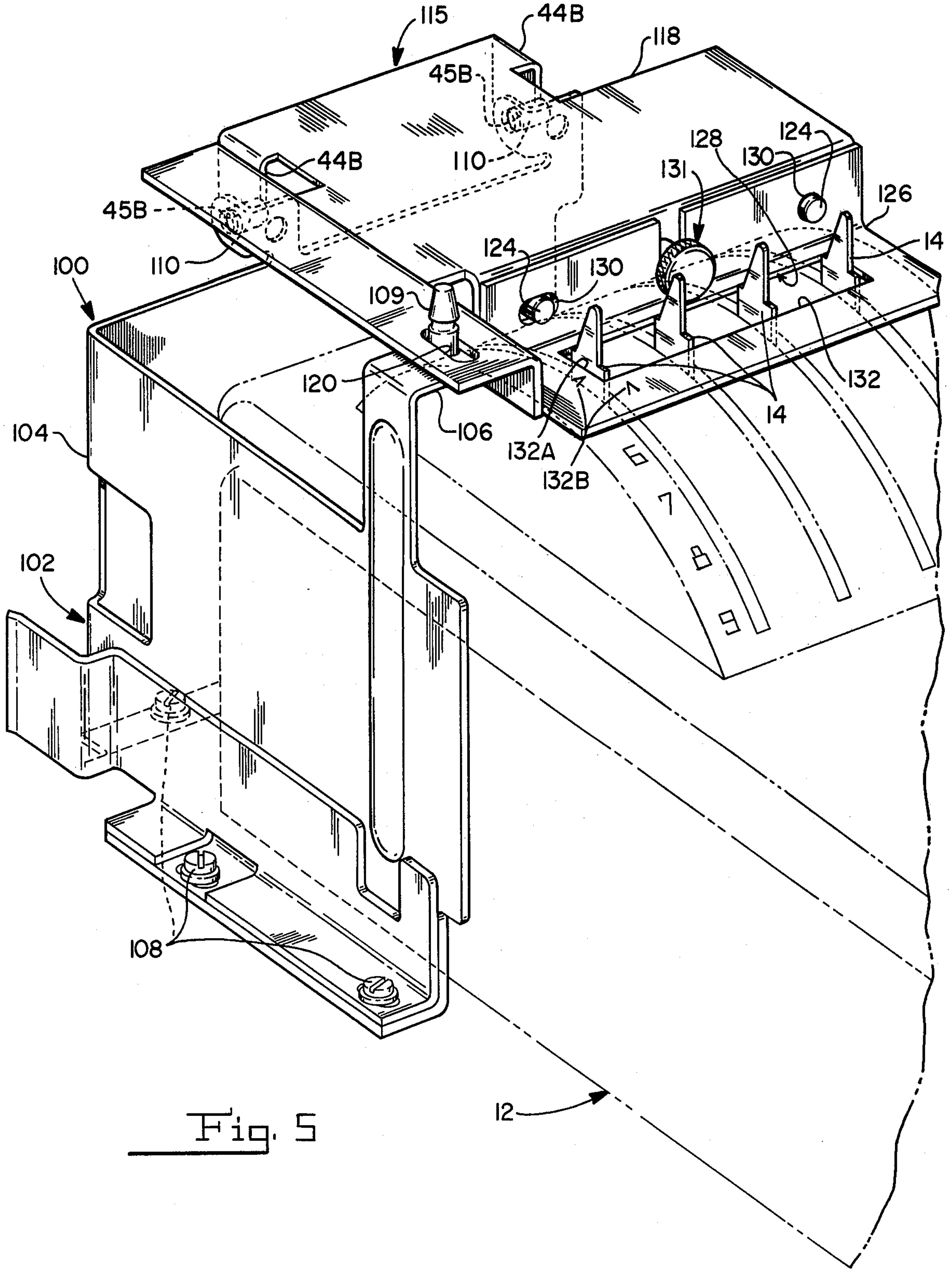
FIG. 5 is a fragmentary perspective view of a second embodiment of gauging means used according to the invention, shown in association with a phantom view of a postage meter.

In a modified version of the actuator 10 (FIG. 1), the actuator's framework (FIG. 5) includes a support 100 which acts as a pedestal for the actuator 10 (FIG. 1). The support 100 (FIG. 5) comprises a base portion 102 that includes an upright skirt wall 104, which is L-shaped in transverse cross-section, and a transversely-extending top wall 106. The skirt wall 104 is preferably adapted, as by means of a plurality of fasteners 108, for attaching the support 100 to any conveniently located structure other than the postage meter 12, so as to permit removal of the postage meter 12 independently of removal of the actuator 10 (FIG. 1), but may be similarly adapted for removable attachment directly to the postage meter 12 (FIG. 5). The support 100 also comprises at least one guide post 109 and a pair of hinge pins 110. The hinge pins 110 are appropriately spaced apart from each other to permit the actuator's hub apertures 45 (FIG. 1) to pivotably receive the support's hinge pins 110 (FIG. 5) for pivotally mounting the actuator's housing 40 (FIG. 1) in engagement with the support 100 (FIG. 5) in a manner which affords for ease of disengagement.

A second embodiment of the apparatus for interconnecting an actuator 10 (FIG. 1) to a postage meter 12, includes a gauge 115 (FIG. 5) for fixing the spatial relationship between the postage meter 12 and actuator 10 (FIG. 1) when the actuator 10 includes the modified support 100 (FIG. 5).

As shown in FIG. 5, the actuator's housing 40 (FIG. 1) is disengaged from the support 100 (FIG. 5), and the gauge 115 is pivotally mounted in place on the support 100. The gauge 115 includes a gauge plate 118 and includes a pair of parallel-spaced depending hubs 44B having apertures 45B. The hubs 44B and apertures 45B correspond to the hubs 44 (FIG. 1) and apertures 45 of the actuator housing 40. The gauge plate 118 (FIG. 5) has at least one reference aperture 120 which is dimensioned for slip-fitting engagement with the support post 109. With this arrangement, assuming the fastener's 108 are loosened, movement of gauge 115 moves the depending hinge pins 110, and thus the connected support 100, relative to the postage meter 12. The gauge 115 additionally include a pair of parallel-spaced reference posts 124 which are fixedly attached to the gauge plate 118 for movement therewith. Further, the gauge 115 comprises a removably mounted gauge arm 126, which is L-shaped in transverse cross-section and has a rectangularly-shaped reference aperture 128 formed therein through which the postage meter levers 14 upwardly protrude. In addition, the gauge arm 126 has a pair of apertures 130 formed therein which are appropriately spaced apart from each other for cooperative slip-fitting engagement with the gauge posts 124, and includes suitable clamping means 131 for rigidly connecting the gauge arm 126 to the gauge plate 118 for movement therewith. And the reference aperture 128 has reference edge 132 and 132A.

For fixing the spatial relationship between the postage meter 12 (FIG. 1) and the modified actuator 10, the fasteners 108 (FIG. 5) are initially loosened to permit movement of the support 100 and thus the connected hinge pins 110 relative to the postage meter 12. In addition, the postage meter levers 14 are postioned in their respective midpoint or "5" positions. Thereafter, while holding the gauge 115 at an angle of approximately 45 degrees with respect to the horizontal, the Installer aligns the hub apertures 45B with the support's hinge pins 110 and slidably engages the respective hubs 44B and hinge pins 110. The gauge 115 may then be pivotally lowered by the Installer while simultaneously shifting the same to align the gauge plate aperture 120 with the support post 109. Whereupon the gauge aperture 120 is slip-fitted into engagement with the support post 109, and the gauge plate arm 126 is lowered over the postage meter levers 14. The postage meter levers 14 are bent as necessary into vertical alignment with each other to facilitate protrusion through the apertures 128. When the levers 14 have been straightened, if necessary, the gauge 115 and thereby the support 100 is shifted to move the reference edge 132 toward the postage meter levers 14 until the reference edge 132 contacts each of the levers 14, and the reference edge 132A contacts the side of the lever 14 which is next adjacent thereto. In this connection, the gauge 115 is provided with indicia 132B to remind the installer of the location of the reference edges 132 and 132A. Whereupon the fasteners 108 are tightened to fix the position of the support 100 relative to the postage meter 12.

The foregoing procedure fixes the position of the actuator's hub apertures 45 (FIG. 1) relative to the postage meter levers 14, by fixing the position of the support's hinge pins 110 (FIG. 5) relative to the postage meter levers 14, while the levers 14 are respectively disposed in their midpoint or "5" positions. On the other hand, for accurately operatively interconnecting the actuator 10 (FIG. 1) and postage meter 12, the spatial relationship between the actuator's hub apertures 45 and actuator's lever positioning members 48, when the members 48 are located midway between their respective limit stops, should correspond to the spatial relationship between the support's hinge pins 110 (FIG. 5) and the postage meter levers 14, when the levers 14 are located in their respective midpoint or "5" positions. And, this may be done after the foregoing procedure by fixing the spatial relationship between the postage meter levers 14 and the actuator's lever positioning members 48 (FIG. 6) when they are respectively located in their midpoint positions. To that end, the apparatus for interconnecting the modified actuator 10 (FIG. 5) and postage meter 12 additionally includes a second gauge arm 140 (FIG. 6).

The second gauge arm 140 (FIG. 6) has reference apertures 130A which are dimensioned for slip-fitting engagement with the posts 124. The second gauge arm 140 also includes a key-shaped aperture 142 which comprises a first plurality of equidistantly-spaced rectangularly-shaped lever alignment slots 144, and, perpendicularly interconnecting the slots 144, a second plurality of equidistantly-spaced, rectangularly-shaped slots 146.

Figures 6, 7, 8:
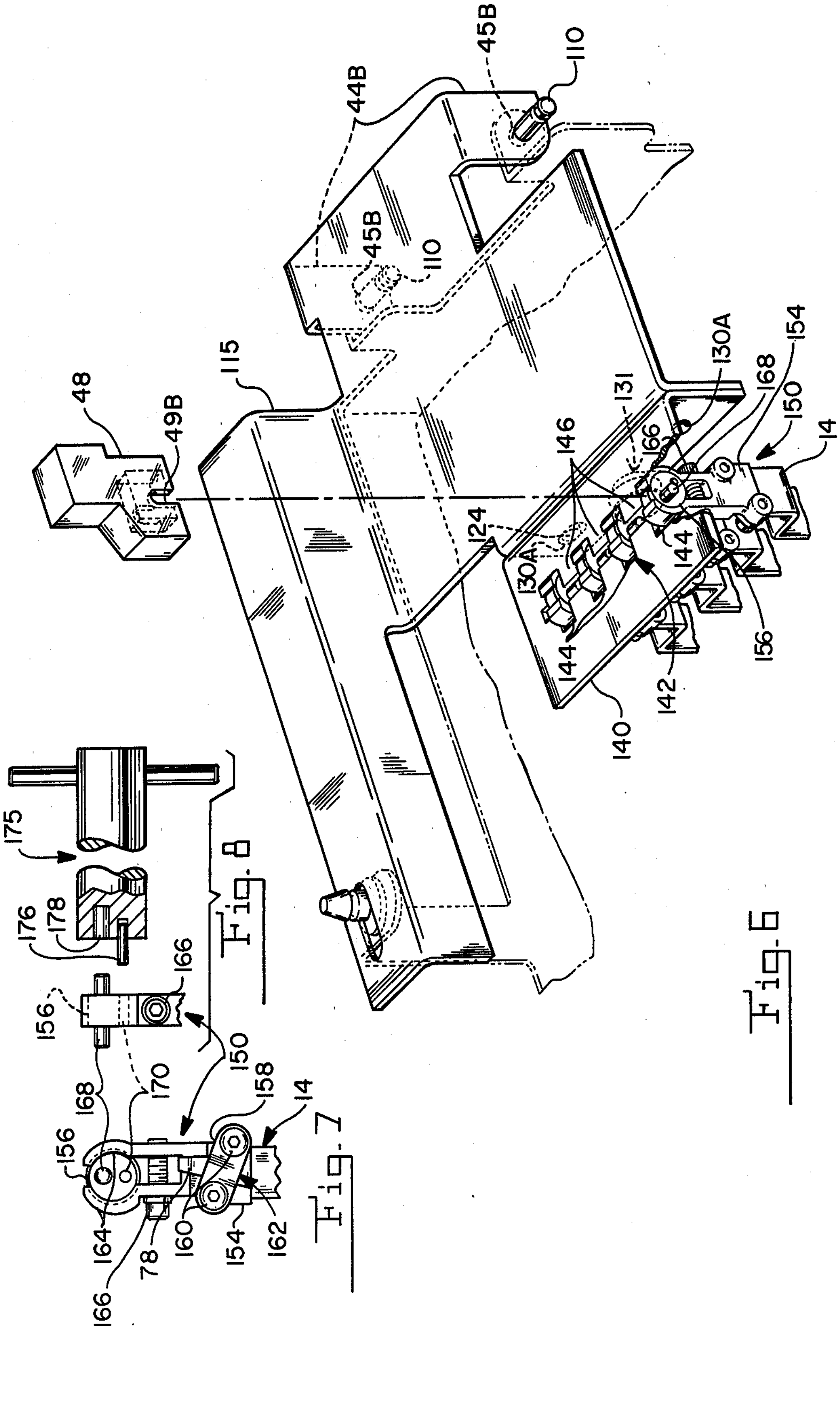
FIG. 6 is a perspective view of the gauging means of FIG. 5, modified to include a gauge arm adapted for mounting a second embodiment of the postage meter lever extension means on a postage meter lever, and showing the manner in which the lever extension means engages the postage meter operating apparatus of FIG. 1.
FIG. 7 is an enlarged side view of the lever extension means of FIG. 6.
FIG. 8 is a fragmentary side view of the lever extension means of FIG. 7 and a suitable tool for adjusting the lever extension means.

In addition, for fixing the spatial relationship between the postage meter levers 14 (FIG. 6) and lever positioning members 48, the apparatus for interconnecting the actuator 10 and postage meter 12 includes a second plurality of postage meter lever extension devices 150 (FIGS. 7 and 8) one for each of the postage meter levers 14 (FIG. 6).

Each of the lever extension device 150 (FIGS. 6–8) includes a body portion 154 and an adjustable head portion 156. The body portion 154 includes a strap 158 which is fixedly attachable thereto by conventional fastening means including a pair of headed screws 160. The strap 158 and screws 160 cooperate with the remainder of the body portion 154 to form a wedge-shaped cavity 162 which is dimensioned to accomodate receiving the free end 78 of the postage meter lever 14, for mounting the lever extension device 150 on the postage meter lever 14. And, for fixedly attaching the lever extension device 150 to the lever's free end 78 for movement with the lever 14, the headed screws 160, which are suitably threadably mounted in the body portion 154, are tightened to urge the strap 158 into engagement with the postage meter lever 14. The body portion 154 also includes a pair of opposed finger members 164 which are dimensioned to rotatably receive the head portion 156. And, for fixedly attaching the head portion 156 to the body portion 154 for movement therewith, the lever extension device 150 includes conventional fastening means, such as a second headed screw 166 which extends through one of the finger member 164 and is suitably threadably attached to the other finger member 164. As thus arranged, rotation of the screw 166 in one direction draws the finger members 164 toward each other to clamp the head portion 156 to the body portion 154, and rotation in the opposite direction loosens the finger members 164 to permit rotation of the head portion 156. The head portion 156 is a disc-shaped, member which includes an eccentrically mounted pin 168 extending therefrom and has a cylindrical-shaped aperture 170 formed therein. The head portion 156 is mounted for rotation between the finger members 164. And, for rotating the head portion 156, there may be provided a T-shaped tool 175 having a pin 176 and aperture 178 which are configured for engagement with the aperture 170 and pin 168 of the head portion 156.

For fixing spatial relationship between the postage meter levers 14 (FIG. 5) and the actuator's lever positioning members 48 (FIG. 1), subsequent to fixing the spatial relationship between both the actuator's hub apertures 45 and support's hinge pins 110 relative to the postage meter levers 14 has hereinbefore discussed; assuming the gauge 115 (FIG. 5) is pivotally attached to the support's hinge pins 110, the gauge 115 is pivotally raised, the gauge arm 126 is replaced by the gauge arm 140 (FIG. 6), and a lever extension device 150 (FIG. 7), having both screws 160 loosened, is mounted on one of the levers 14. Whereupon the extension device 150 may be fixedly attached to its associated lever 14 by tightening the screws 160. Thereafter, the gauge 115 is pivotally lowered to determine the location of the attached device's pin 168 (FIG. 6) relative to the associated gauge arm slot 146, and to determine whether or not the levers 14 must be bent into vertical alignment with each other for protrusion through the gauge arm slot 144. If necessary, the levers 14 are appropriately straightened. Then the gauge 115 is raised and the head portion 156 (FIG. 7) of the attached lever extension device 150 is rotatably moved, as by means of the tool 175 (FIG. 8), for moving the pin 168 toward and into alignment with the associated pin alignment slot 146 (FIG. 6). Whereupon the gauge 115 is again pivotally lowered to check alignment of the pin 168 and slot 146; and, assuming the pin 168 is properly aligned, the second set screw 166 is tightened for fixedly attaching the device's head portion 156 to its associated body portion 154. The foregoing procedure is repeated until a lever extension device 150 is properly attached to each of the levers 14. Inasmuch as the same predetermined spatial relationship exists between the gauge slots 146 and gauge's hub apertures 45B as exists between the lever positioning member's slots 49B and actuator's hub apertures 45 (FIG. 1), when the postage meter levers 14 and lever positioning members 48 are respectively disposed in their midpoint positions; the result of the foregoing procedure is to properly fix the spatial relationship between the postage meter levers 14 and lever positioning members 48 (FIG. 6) to permit accurate operation of the postage meter 12 (FIG. 5) by the actuator 10 (FIG. 1). Accordingly, the gauge 115 (FIG. 6) may be removed by pivotally raising the gauge 115 and slidably disengaging the respective gauge hubs 44B and support's hinge pins 110. Whereupon the Installer may move the levers 14 and lever positioning members 48 to any desirable or predetermined position in which they are in correspondence with each other, align the actuator's hub apertures 45 (FIG. 1) with the hinge pins 110, (FIG. 6), slidably engage the respective actuator hubs 44 (FIG. 1) and hinge pins 110 (FIG. 6) and pivotally lower the actuator 10 and thus the lever positioning members 48 into engagement (FIG. 6) with the lever extension devices 150.

In accordance with the objects of the invention there has been described a process and apparatus for interconnecting a postage meter and apparatus for operating the postage meter; and more particularly, there is provided a process and apparatus for interconnecting a postage meter, having postage value selecting levers, with an actuator, having means for positioning the levers in a plurality of postage value selecting positions.

Inasmuch as certain changes may be made in the above described invention without departing from the spirit and scope of the same, it is intended that all matter contained in the above description or shown in the accompanying drawings shall be interpreted in an illustrative rather than limiting sense. And, it is intended that the following claims be interpreted to cover all the generic and specific features of the invention herein described.

We claim:

1. A process for interconnecting a postage meter and apparatus for operating said postage meter, wherein said postage meter includes a lever which is positionable in a plurality of postage value selecting positions, said apparatus includes means for positioning said postage meter lever, and said lever positioning means includes a member which is positionable in a plurality of predetermined positions respectively corresponding on a one for one basis with one of the lever's predetermined postage value selecting positions, said process comprising the steps of:

a. fixing the spatial relationship between the postage meter and meter operating apparatus;
b. fixing the spatial relationship between the postage meter lever and lever positioning means; and
c. engaging said postage meter lever and lever positioning member.

2. The process according to claim 1, wherein step (a) includes the step of relatively positioning with respect to each other said postage meter lever and reference means of said apparatus.

3. The process according to claim 1, wherein step (b) includes the step of relatively positioning with respect to each other said lever positioning member and said postage meter lever.

4. The process according to claim 2, wherein step (a) includes the steps of:

1. connecting gauge means to a said apparatus; and
2. positioning a reference member of said gauge means and thereby the reference member of said apparatus with respect to the postage meter lever while said postage meter lever is in one of said predetermined postage value selecting positions.

5. The process according to claim 4, wherein step (b) includes the steps of:

1. connecting adjustable means to said postage meter lever; and
2. positioning a reference member of said adjustable means which respect to a second reference member of said gauge means while said postage meter lever is in said one postage value selecting position.

6. The process according to claim 5, wherein step (b) includes the step of:

3. removing said gauge means;
4. positioning said lever positioning member and postage meter lever in corresponding positions; and
5. engaging said lever and lever positioning members.

7. A process for mounting an actuator in operating relationship with respect to a postage meter, wherein said postage meter includes first reference means and a movable potage value selecting lever, and wherein said actuator includes second reference means and means for positioning said postage value selecting lever, said process comprising:

a. positioning with respect to each other said first and second reference means; and
b. relatively positioning with respect to each other said postage meter lever and said means for moving said postage meter lever.

8. The process according to claim 7, wherein step (a) includes the steps of:

1. connecting gauging means to said actuator; and
2. positioning said gauging means and thereby said second reference means with respect to said first reference means.

9. The process according to claim 7, wherein step (a) includes the steps of:

1. connecting gauging means to said second reference means; and
2. positioning said gauging means and thus said second reference means with respect to said postage meter lever when said postage meter lever is located in a predetermined position.

10. The process according to claim 7, wherein step (b) includes the steps of:

1. connecting adjustable means to said postage meter lever; and
2. adjusting said adjustable means with respect to said lever positioning means.

11. The process according to claim 9, wherein step (b) includes the steps of:

1. connecting adjustable means to said postage meter lever; and
2. adjusting said adjustable means with respect to said gauging means when said postage meter lever is located in said predetermined position.

12. The process according to claim 10, wherein step (a) preceeds step (b), and including the steps of:

c. removing said gauging means;

d. moving said lever positioning means and postage meter levers to corresponding positions; and e. engaging said lever positioning means and said postage meter lever.

13. Apparatus for interconnecting a postage meter and means for operating the postage meter, wherein said postage meter includes a lever which is positionable in a plurality of postage value selecting positions, and said meter operating means includes means for positioning said postage meter lever, said apparatus comprising:

a. means for adjusting the spatial relationship between said postage meter and said meter operating means, and b. means for fixing the spatial relationship between said postage meter lever and said lever positioning means.

14. The apparatus according to claim 13, wherein said adjusting means includes gauge means, and said fixing means includes lever extension means.

15. The apparatus according to claim 13, wherein said adjusting means includes gauge means, said gauge means is adapted to be removably attached to said meter operating means for movement of at least a portion thereof relative to said postage meter when said gauge means is moved, and said gauge means including reference means movable therewith into contact with the postage meter lever for adjusting the spatial relationship of the attached meter operating means with respect to said postage meter.

16. The apparatus according to claim 13, wherein said fixing means includes a lever extension device having a body portion and a head portion, said body portion adapted to be fixedly attached to said postage meter lever for attaching said lever extension device to said lever, and said head portion movably attached to said body portion.

17. The apparatus according to claim 15, wherein said gauge means includes means for defining proper vertical orientation of said postage meter lever.

* * * * *